US007496734B1

(12) United States Patent
Richardson et al.

(10) Patent No.: US 7,496,734 B1
(45) Date of Patent: Feb. 24, 2009

(54) SYSTEM AND METHOD FOR HANDLING REGISTER DEPENDENCY IN A STACK-BASED PIPELINED PROCESSOR

(75) Inventors: Nicholas J. Richardson, San Diego, CA (US); Lun Bin Huang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/561,241

(22) Filed: Apr. 28, 2000

(51) Int. Cl.
*G06F 9/30* (2006.01)
(52) U.S. Cl. ..................................... 712/217; 712/202
(58) Field of Classification Search ................. 712/202, 712/217, 219
See application file for complete search history.

(56) References Cited

U.S. PATENT DOCUMENTS

| | | | | |
|---|---|---|---|---|
| 4,112,489 A | * | 9/1978 | Wood .......................... | 712/218 |
| 4,974,158 A | * | 11/1990 | Watanabe et al. ........... | 712/202 |
| 4,989,138 A | * | 1/1991 | Radochonski ............... | 710/119 |
| 5,142,635 A | * | 8/1992 | Saini .......................... | 712/225 |
| 5,471,626 A | * | 11/1995 | Carnevale et al. ........... | 712/219 |
| 5,522,051 A | * | 5/1996 | Sharangpani ............... | 712/202 |
| 5,548,736 A | * | 8/1996 | Asakawa et al. ............ | 712/244 |
| 5,566,307 A | * | 10/1996 | Watanabe et al. ........... | 712/202 |
| 5,574,871 A | * | 11/1996 | Hoyt et al. .................. | 712/200 |
| 5,687,336 A | * | 11/1997 | Shen et al. .................. | 712/202 |
| 5,701,508 A | * | 12/1997 | Glew et al. ..................... | 712/23 |
| 5,852,726 A | * | 12/1998 | Lin et al. .................... | 712/200 |
| 5,857,089 A | * | 1/1999 | Goddard et al. ............. | 712/222 |
| 5,905,881 A | * | 5/1999 | Tran et al. .................. | 712/219 |
| 5,913,047 A | | 6/1999 | Mahalingaiah et al. | |
| 5,974,531 A | | 10/1999 | Shang et al. | |
| 5,987,596 A | | 11/1999 | Walker | |
| 5,996,068 A | * | 11/1999 | Dwyer, III et al. ........... | 712/228 |
| 6,119,223 A | * | 9/2000 | Witt ............................ | 712/244 |
| 6,122,656 A | * | 9/2000 | Witt ............................ | 718/100 |
| 6,122,727 A | * | 9/2000 | Witt ............................ | 712/214 |
| 6,134,573 A | * | 10/2000 | Henry et al. ................ | 708/510 |
| 6,212,622 B1 | * | 4/2001 | Witt ............................ | 712/216 |

(Continued)

FOREIGN PATENT DOCUMENTS

EP 0 851 343 A2 7/1998

OTHER PUBLICATIONS

InstantWeb Online Computing Dictionary. http://www.instantweb.com/D/dictionary/foldoc.cig?Free+On-line+Dictionary. (c) 1994-1999 InforStreet, Inc. Search Items: "central processing unit", "computer", "first in first out", "stack", and "virtual memory".*

(Continued)

*Primary Examiner*—Aimee J Li
(74) *Attorney, Agent, or Firm*—Lisa K. Jorgenson; William A. Munck (57) ABSTRACT

There is disclosed a data processor comprising 1) a register stack comprising a plurality of architectural registers that stores operands required by instructions executed by the data processor; 2) an instruction execution pipeline comprising N processing stages, where each processing stage performs one of a plurality of execution steps associated with a pending instruction being executed by the instruction execution pipeline; and 3) at least one mapping register associated with at least one of the N processing stages, wherein the at least one mapping register stores mapping data that may be used to determine a physical register associated with an architectural stack register accessed by the pending instruction.

15 Claims, 3 Drawing Sheets

U.S. PATENT DOCUMENTS 6,212,623 B1 * 4/2001 Witt .......................... 712/216
6,591,359 B1 * 7/2003 Hass et al. ................. 712/217

OTHER PUBLICATIONS

Weiss, Mark Aleen. "Data Structures and Algorithm Analysis in C++". Second Edition. Reading, Mass.: Addison Wesley Longman, Inc. ©1999. pp. 93-115.*

Microsoft Press®. "Computer Dictionary: The Comprehensive Standard for Business, Scholl, Library, and Home". Second Edition. Redmond, Washington: Microsoft Press ©1994. p. 371.*

Stevens, Mark A. ed. "Marriam-Webster's Collegiate® Dictionary". Tenth Edition. Springfield, Mass.: Marriam-Webster, Inc. ©1997. p. 1143.*

* cited by examiner

SYSTEM AND METHOD FOR HANDLING REGISTER DEPENDENCY IN A STACK-BASED PIPELINED PROCESSOR

TECHNICAL FIELD OF THE INVENTION

The present invention is directed, in general, to data processing systems and, more specifically, to a system for handling data dependencies in a stack-based pipelined processor.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an "n" stage pipeline is capable of simultaneously processing "n" instructions. When filled with instructions, a processor with "n" pipeline stages completes one instruction each clock cycle.

The execution rate of a pipeline processor is theoretically "n" times faster than an equivalent non-pipelined processor. A non-pipelined processor is a processor that completes execution of one instruction before proceeding to the next instruction. Typically, pipeline overheads and other factors decrease somewhat the execution advantage rate that a pipelined processor has over a non-pipelined processor.

A simplified five stage processor pipeline may consist of an instruction fetch (IF) stage, a decode (DCD) stage, an operand fetch (OF) stage, an execute (EXE) stage, and a write-back (WBK) stage. In addition, the processor may have an instruction cache that stores program instructions for execution, a data cache that temporarily stores data operands that otherwise are stored in processor memory, and a register stack that also temporarily stores data operands.

The instruction fetch stage fetches an instruction for execution from the instruction cache and stores it into an instruction fetch buffer (IFB). The decode stage takes the instruction from the instruction fetch buffer in the instruction cache and decodes the instruction into a set of signals that can be directly used for executing subsequent pipeline stages. The operand fetch stage fetches required operands from the data cache or registers in the register stack. The execute stage performs the actual programmed operation (e.g., add, multiply, divide, and the like) on the operands fetched by the operand fetch stage and generates the result. The write-back stage then writes the result generated by the execute stage back into the data cache or the register stack.

Assuming that each pipeline stage completes its operation in one clock cycle, the described five stage processor pipeline takes five clocks cycles to process one instruction. As previously described, once the pipeline is full, an instruction can theoretically be completed every clock cycle.

A typical pipeline program instruction sequence may have several instructions with dependencies on the results and effects of preceding instructions. As a result, there is normally some degree of interaction between instructions which occupy different stages of the pipeline. For example, a given instruction may need to use the data result from an earlier instruction as its operands.

Consider the previously described five stage pipeline with three registers (A, B, C) in the register file and a hypothetical program sequence with three instructions. The first two instructions load one operand each from memory into registers A and B, respectively. The third instruction increments the contents of register A. The program may be represented as follows:

| | | |
|---|---|---|
| 1) Ld Mem1, A | (load contents of Mem. location 1 into Reg. A) |
| 2) Ld Mem2, B | (load contents of Mem. location 2 into Reg. B) |
| 3) Inc A | (increment the contents of Reg. A) |

For this example, the increment instruction has a dependency on the first instruction. The increment instruction must wait until the first instruction loads register A with the content of memory location 1 before it can increment the content of register A.

In the prior art, there are generally three ways of dealing with such data dependencies. First, there may not be a problem and no special action may be required. It is possible that the dependent instruction (increment, for example) is not affected. This is the case if the pipeline has processed the first instruction to the point that the memory data is loaded into register A by the time the third instruction is ready to increment data in register A. This would be the case if two or more clock cycles provide enough time for the first instruction to proceed through the execute and write-back stages and to write the result into register A before the third instruction needs the new value of register A when it enters the operand fetch stage.

Second, it may be possible to delay processing of one or more stages so that data is available when required. For example, the increment instruction requires the result of the first load instruction by the time the increment instruction is in the operand fetch stage. By holding the increment instruction in the decode stage for two clock cycles instead of one, the first instruction can proceed through the execute and write-back stages, which results in register A being loaded with the required operand data by the time the increment instruction is in the operand fetch stage. Thus, a one clock cycle delay is incurred for the increment instruction.

Third, it may be possible to transfer data directly between pipeline stages by eliminating or bypassing selected operations. For example, the increment instruction requires the result of the first instruction when the increment instruction is in the operand fetch stage and the first instruction is in the write-back stage. Under these conditions, the load instruction is about to write the required data from memory into register A. However, the data from memory that is destined for register A is actually still in temporary registers in the write-back stage, ready for transfer to register A. At this point, the contents of the temporary registers may be sent directly to the operand fetch stage for use by the increment instruction, thereby bypassing register A. This bypass prevents the increment instruction from incurring any delay.

The described delay and bypass scenarios require logic that detects when one instruction depends upon the result of a previous one. For simple pipeline processors such as the one described, the detection of data dependence between instructions is performed via a mechanism generally known as a register scoreboard. A register scoreboard comprises logic that tracks which of the processor registers (A, B, C in the example) are about to be updated by instructions that are active in the pipeline. The register scoreboard also identifies which pipeline stage is occupied by the respective instructions during any given clock cycle. Thus, a subsequent instruction can check the register scoreboard to determine whether its required source operands (A, B, or C) are in the process of being generated by preceding instructions in the pipeline. If the source operands are being generated, the dependent instruction may then perform a stalling (delay) operation or a bypassing operation to obtain the required data.

This process works well in the most common forms of microprocessor architectures which have on-chip registers with fixed names that are referenced by fixed allocated codes embedded in the instructions. For these architectures, it is relatively simple to check whether a source register requested by an instruction in an early pipeline stage is also the destination (target) register of an instruction in a later pipeline stage. An instruction in a later pipeline stage precedes an instruction in an earlier pipeline stage. The processor may perform this analysis by examining source register and storage (target) register addresses of each instruction in the pipeline for a match. When a match is found, appropriate delay or bypass actions are taken.

Pipeline processors implemented with a register-stack based architecture have a more complex problem when addressing data dependencies between pipelined instructions. This problem is caused by the fact that the addresses of architectural registers which store the data results of particular operations (i.e., those registers seen by the program) are no longer fixed, but dynamically change in response to instruction execution.

For example, a register-stack based architecture is generally based on the premise that the architectural registers are organized as a first-in-first-out (FIFO) stack. Instructions requiring source operands in a register-stack architecture implicitly use the data from the top of the stack by first popping it from the top of the stack and then by pushing any result to the top of the stack when execution is completed. Thus, all stack entries move toward the top of the stack when dependent data is removed from the stack and toward the bottom of the stack when result data is added to the stack.

To illustrate this problem, consider the previous instruction series as implemented for a register-stack based processor. For this example, registers A, B, and C are organized as a register-stack, with register A always being at the top of the stack, register B in the middle, and register C at the bottom.

| | | |
|---|---|---|
| 1) Ld Mem1, A | (load contents of Mem. location 1 into Reg. A) | |
| 2) Ld Mem2, A | (push old contents of Reg. A into Reg. B, then store data from Mem. location 2 into Reg. A) | |
| 3) Inc B | (explicitly increment the contents of Reg. B) | |

The fundamental difference between this example and the previous example is that, although the data in memory 1 was originally loaded into register A, it is in register B by the time the increment B instruction is executed. Therefore, the first and third instructions of both examples have the same dependency even though the explicitly-named source and destination registers are different.

Thus, the register stack-based architecture adds complexity to the pipeline data dependency problem, since the architectural registers (i.e., those registers seen by the program) dynamically change as each subsequent instruction is executed in the pipeline. In fact, the architectural register in which the required data result resides can be changed by any or all intervening instructions between the instruction creating the data and the instruction requiring the data.

Therefore, there is a need in the art for improved pipelined processors that are less susceptible to data dependency problems between different stages of the instruction pipeline. In particular, there is a need for an improved register stack-based architecture for pipelined processors that does not incur a performance penalty when data dependencies exist between different stages of the instruction pipeline. More particularly, there is a need for a register stack-based, pipelined processor in which the addresses of architectural registers may be dynamically changed which is capable of handling data dependencies without incurring a performance penalty.

SUMMARY OF THE INVENTION

To address the above-discussed deficiencies of the prior art, it is a primary object of the present invention to provide a data processor comprising 1) a register stack comprising a plurality of architectural registers capable of storing operands required by instructions executed by the data processor; 2) an instruction execution pipeline comprising N processing stages, each of the N processing stages capable of performing one of a plurality of execution steps associated with a pending instruction being executed by the instruction execution pipeline; and 3) at least one mapping register associated with at least one of the N processing stages, wherein the at least one mapping register is capable of storing mapping data that may be used to determine a physical register associated with an architectural stack register accessed by the pending instruction.

According to an advantageous embodiment of the present invention, the mapping data comprises a physical identifier code identifying the physical register.

According to one embodiment of the present invention, the mapping data comprises a virtual identifier identifying the architectural register.

According to another embodiment of the present invention, the physical register is one of: 1) a source register containing a first operand to be retrieved by the pending instruction and 2) a target register in which the first operand is to be stored by the pending instruction.

According to still another embodiment of the present invention, the at least one mapping register comprises a first mapping register associated a first one of the N processing stages and a second mapping register associated with the second one of the N processing stages.

According to yet another embodiment of the present invention, the first mapping register is capable of storing first mapping data that may be used to determine a first physical register associated with a first architectural stack register accessed by a first instruction being processed in the first processing stage and wherein the second mapping register is capable of storing second mapping data that may be used to determine a second physical register associated with a second architectural stack register accessed by a second instruction being processed in the second processing stage.

According to a further embodiment of the present invention, the first mapping register is capable of transferring the first mapping data to the second mapping register when the first instruction is transferred from the first processing stage to the second processing stage.

According to a still further embodiment of the present invention, the data processor further comprises a third mapping register associated with the register stack capable of storing third mapping data that may be used to determine third physical register associated with third architectural stack register accessed by a last executed instruction.

According to a yet further embodiment of the present invention, the data processor is capable of transferring the third mapping data from the third mapping register to at least one of the first mapping register and the second mapping register.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
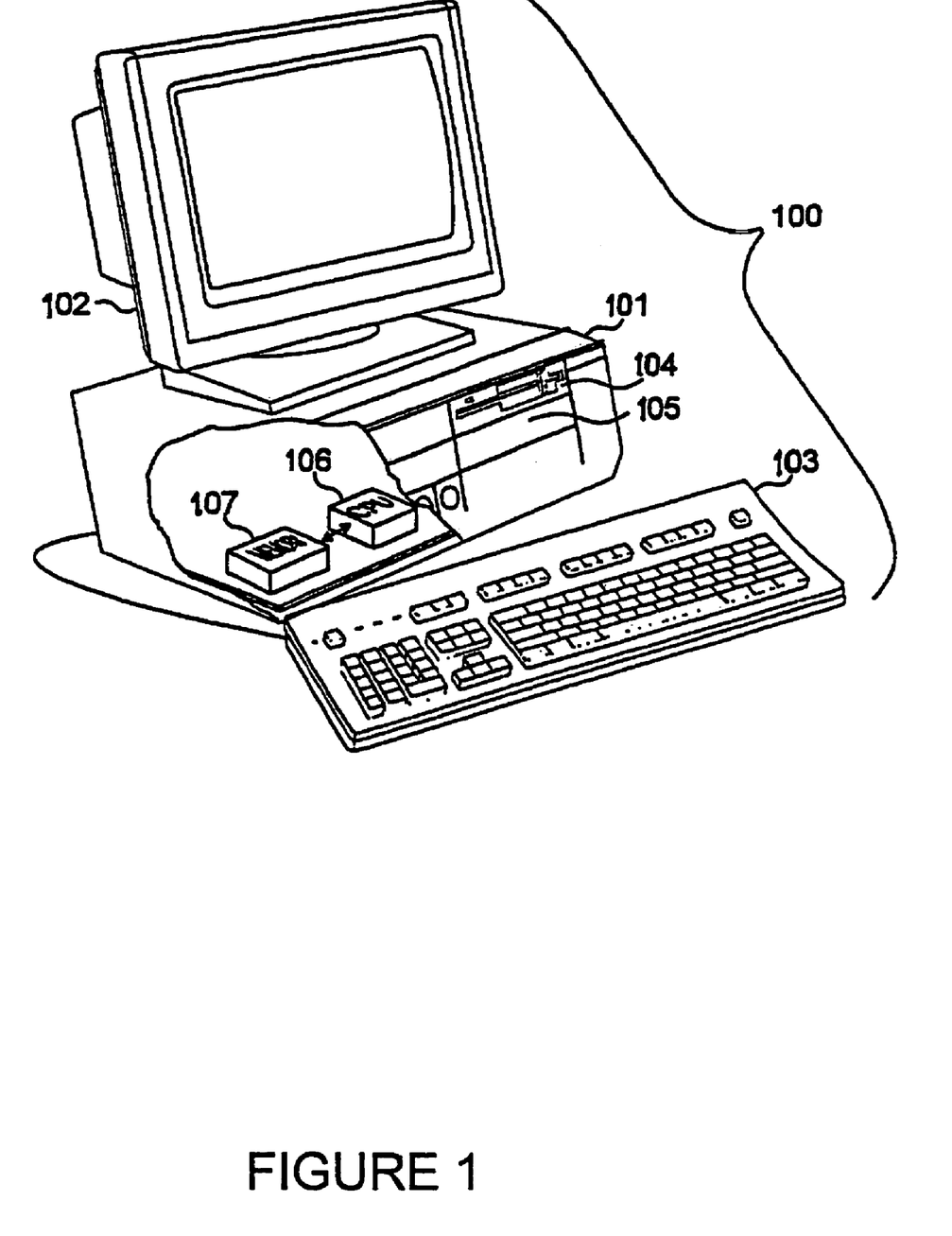
FIG. 1 illustrates an isometric view of an exemplary processing system, namely a personal computer, that contains a register stack-based, pipelined processor in accordance with the principles of the present invention.
Figure 2:
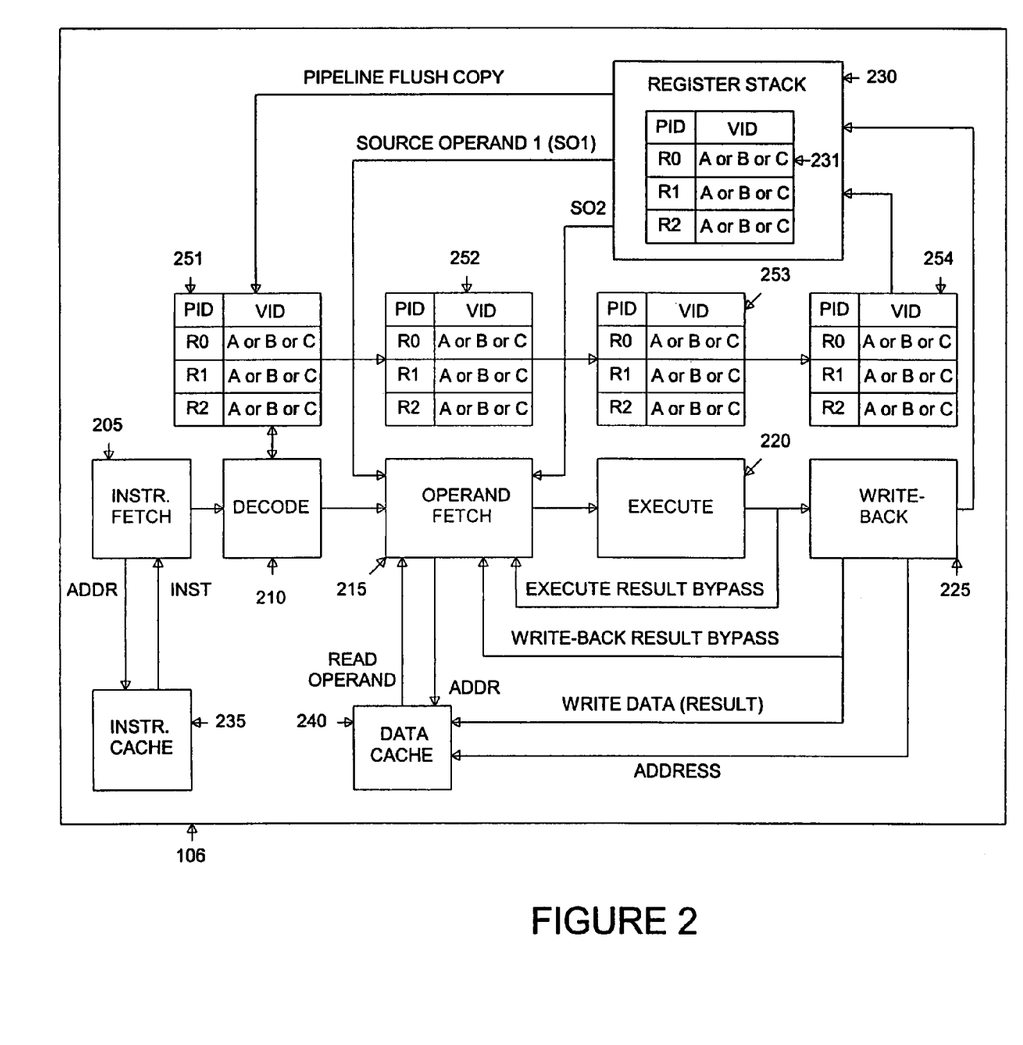
FIG. 2 illustrates in greater detail the exemplary pipelined processor according to one embodiment of the present invention.
Figure 3:
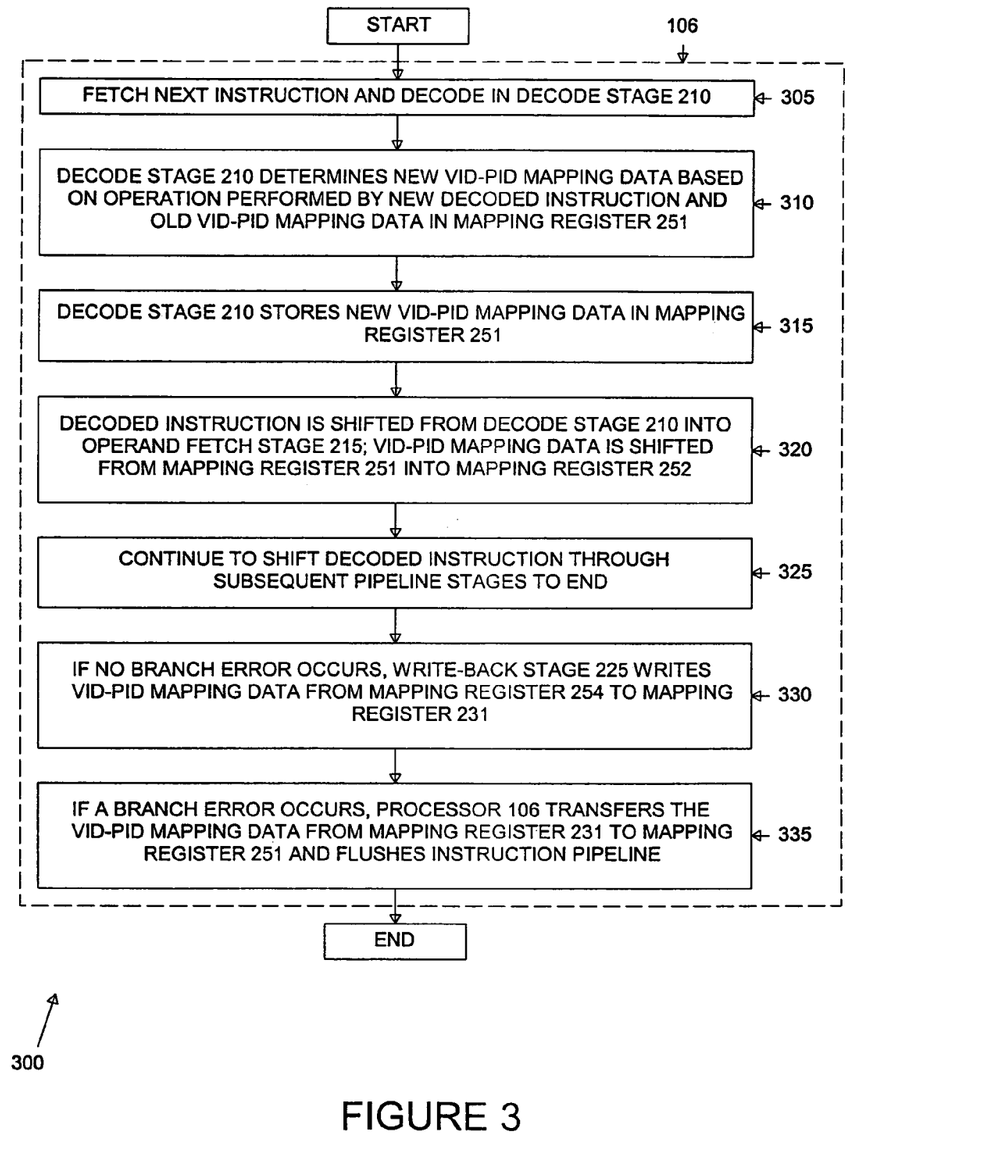
FIG. 3 is a flow chart illustrating the operation of the exemplary pipelined processor according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

FIG. 1 illustrates an isometric view of an exemplary processing system, namely personal computer 100, that contains register stack-based, pipelined processor 106 in accordance with the principles of the present invention. Personal computer 100 comprises chassis 101, monitor 102 and keyboard 103. Monitor 102 and keyboard 103 may be replaced by, or combined with, other input/output (I/O) devices. Chassis 101 is illustrated with a cutaway view that shows floppy disk drive 104 and hard disk drive 105. Floppy disk drive 104 is capable of reading and writing to removable floppy diskettes. Hard disk drive 105 provides fast access data storage and retrieval.

In an exemplary embodiment of the present invention, processor 106 may comprise an on-board two level cache system, including a Level 1 (L1) cache and a Level 2 (L2) cache. The two level cache is a system in which a small, fast cache (the L1 cache) is connected to a slower, larger cache (the L2 cache). When the CPU core logic of processor 106 reads or writes data to or from a memory location, the cache system first tests to see if the data belonging to that location is in the L1 cache. If the data is in the L1 cache, then the data is provided or updated quickly by the L1 cache. If the data is not in the L1 cache, then an L1 cache read "miss" or an L1 cache write "miss" has occurred. The data is then provided or updated to the CPU core logic by the L2 cache. In the case of an L1 cache read miss, the line containing the requested data is also transferred from the L2 cache to the L1 cache, so that the data may be provided more quickly the next time processor 106 accesses the data. This is known as an L1 cache line fill. If the data is also not in the L2 cache, then an L2 cache miss has occurred and the line containing the requested data is fetched from main memory and then loaded into the L2 cache for faster access the next time the data is requested. This is known as an L2 cache line fill.

FIG. 2 illustrates in greater detail exemplary pipelined processor 106 according to one embodiment of the present invention. Processor 106 contains an instruction pipeline comprising instruction fetch (IF) stage 205, decode stage 210, operand fetch stage 215, execute stage 220, and write-back stage 225. Processor 106 also comprises register stack 230, instruction cache 235, data cache 240 and mapping registers 251-254. Instruction cache 235 and data cache 240 are the portions of the L1 cache that hold instructions and data, respectively.

Processor 106 is a central processing unit (CPU) capable of fetching and interpreting instructions, retrieving data, executing instructions, and storing results. The illustrated pipeline is a mechanism capable of executing several different operations concurrently. The pipeline does this by breaking down the processing steps for each major task into several discrete processing phases, each of which is executed by a separate pipeline stage. Each task must pass sequentially through each processing phase, and hence each pipeline stage, to complete its execution.

Instruction fetch stage 205 fetches an instruction for execution from instruction cache 235 and transfers it into an instruction fetch buffer (IFB). Decode stage 210 takes the instruction from the instruction fetch buffer and decodes the instruction into sets of signals that can be used directly for execution by subsequent pipeline stages. Operand fetch stage 215 fetches operands from data cache 240 or register stack 230. Execute stage 220 executes the instruction specified operation on the operands fetched in operand fetch stage 215 (e.g., add, multiply, divide, and the like) and generates the results. Write-back stage 225 writes the results generated by execute stage 220 back into data cache 240 or into register stack 230.

In accordance with the principles of the present invention, each of mapping registers 251-254 stores a logical mapping between a physical register and an architectural name of a physical register. Each of mapping registers 251-254 is associated with a particular stage in the execution pipeline. In the illustrated embodiment, mapping register 251 is associated with decode stage 210, mapping register 252 is associated with operand fetch stage 215, mapping register 253 is associated with execute stage 220, and mapping register 254 is associated with write-back stage 225. When an instruction is fetched and decoded by decode stage 210, decode stages 210 determines the mapping between the architectural name of a register in an instruction and the physical register that actually holds the data needed by that instruction. This mapping is placed in mapping register 251. As the instruction flows into subsequent pipeline stages, the mapping flows along with the instruction through mapping register 252, mapping register 253, and mapping register 254.

Each physical register in register stack 230 is designated by two different identifiers. The first identifier is known as the physical identifier (PID). The PID is a fixed binary code that identifies a specific on-chip physical register in register stack 230. Thus, each PID is hardwired as part of the design and is unchangeable. The second identifier is known as the virtual identifier (VID). The VID represents the architectural name (e.g., A, B, C) of the physical register seen by programs. Thus, a VID may change as instructions reorder entries in register stack 230. Each VID is stored in a separate binary VID field associated with each physical register.

Once write-back stage 225 writes a result generated by execute stage 220 into a physical register with a particular VID in register stack 230, the result remains in the physical register until write-back stage 225 overwrites the result with a new result designated for the same physical register. If a subsequent instruction causes an existing result to alter its position (i.e., change its architectural register) in register stack 230, the position change is reflected by writing the VID representing the new architectural register into the VID field of the physical register in which the result resides.

As each instruction entering the pipeline is decoded, decode stage 210 determines the new mapping between VIDS and PIDS for that instruction. All instruction references to architectural (virtual) registers are replaced with their equivalent physical register name (PID). As an instruction flows further down the pipeline, the PIDs of the source and target registers of the instruction and the VID-PID mapping of the instruction are sent along with the instruction. This is accomplished by shifting the PID information and the VID-PID mapping information through mapping registers 251-254.

The VID-PID mapping for each instruction must take into account the effects of all preceding instructions. Therefore, when a new instruction enters decode stage 210, decode stage 210 creates the new VID-PID mapping by taking into account the VID-PID mapping of the previous instructions as well as the effect of the new instruction on the VID-PID mapping. Once the source register and/or target register associated with an instruction have been converted from VIDs into PIDs, the register scoreboarding logic may directly compare the source and target PIDs of different instructions in the pipeline to determine whether stalling or bypassing is required for any given instruction. This is a straight forward process because the PIDs are always absolute, unambiguous references to physical registers.

By way of example, three architectural registers A, B, and C (i.e., VIDS) may be mapped to three physical registers R0, R1, R2 (i.e., PIDS). For the sample instruction sequence described above in the BACKGROUND OF THE INVENTION, the new source and destination registers as well as the new VID-PID mapping computed by decode stage 210 becomes:

| [starting map] | R0 = A, R1 = B, R2 = C |
| 1) Load Mem1, R2 | R0 = B, R1 = C, R2 = A (= mem1) |
| 2) Load Mem2, R1 | R0 = C, R1 = A, (= mem2), R2 = B (= mem1) |
| 3) Inc R2 | R0 = C, R1 = A, (= mem2), R2 = B (= mem1 + 1) |

The data dependency (on physical register R2) between instruction 1 and instruction 3 is now explicitly revealed after replacing the architectural register name with the physical register name.

The VID-PID mapping in decode stage 210 may become inaccurate if a pipeline flush occurs. This can occur when some instructions in the pipeline are executed speculatively, depending on the result of a previous instruction. For example, if instructions are speculatively executed from a predicted branch path and the branch prediction is not correct, then the effects of the speculatively executed instructions must be annulled. In part, this involves correcting the VID-PID mapping in decode stage 210 to remove the effects of canceled instructions. This is, in part, why the VID-PID mapping for each instruction is sent through mapping registers 251-254 along with the instruction itself. The mapping for the last instruction to execute is stored in register stack 230 itself. When incorrectly executed speculative instructions are flushed from the pipeline, the VID-PID mapping associated with the last correctly-executed instruction (which is still in the mapping registers of register stack 230) is copied into the VID-PID mapping held in mapping register 251 for decode stage 210.

Thus, the present invention overcomes the data dependency problems associated with register stack-based pipelined processor architectures through the following steps:

1. For a pipelined, register stack-based machine, decode stage 210 determines which on-chip physical register is mapped to which architectural (program-visible) register using a virtual identifier (VID) associated with the physical identifier (PID) of each physical register.

2. Decode stage 210 converts architectural register names (designated by VIDs) into physical register names (designated by PIDs) in the current VID-PID mapping in mapping register 251, which changes with each instruction flowing through decode stage 210.

3. As each new instruction enters decode stage 210, decode stage 210 replaces the architectural source and target register names with the physical source and target register names (PIDs) Decode stage 210 sends the VID-PID mapping associated with each instruction down the pipeline along with the instruction using mapping registers 251-254.

4. Each stage of the pipeline compares the PIDs of different instructions in the pipeline to determine the absolute source of target dependencies and to determine whether stalling or bypassing is required.

5. In the instruction pipeline is flushed to cancel incorrect speculatively-executed instructions, processor 106 rolls back the VID-PID mapping in decode stage 210 by overwriting it with the VID-PID mapping of the last correctly executed instruction, which is held in mapping register 231 associated with register stack 230.

As FIG. 2 illustrates, processor 106 may be more generally described as an N stage pipelined CPU, the final stage of which writes results to one of M physical data registers. Each of the M physical data registers has a fixed physical register name, given by a Physical Identifier (PID), and a variable architectural register name, given by a Virtual Identifier (VID), that is held in a VID register. One VID register is associated with each physical data register.

Processor 106 uses an instruction set architecture (ISA) that permits each instruction either to write new results to architectural registers or to reorder existing results between architectural registers (such as in a stack-based architecture), or both. An architectural-register reordering mechanism associated with each stage allows instructions to symbolically, rather than physically, reorder results between architectural registers by changing the contents of the VID registers associated with each physical data register. This eliminates the transfer of data between physical registers for operations that simply reorder data between registers, and hence eliminates potential data dependencies caused by such transfers.

Processor 106 also comprises an architectural register name (VID) to physical data register name (PID) mapping mechanism that is associated with an early pipeline stage (e.g., decode sage 210). The VID-PID mapping mechanism uses a VID-PID mapping table to convert the architectural register names (VIDs) used by the CPU instruction entering that pipeline stage into physical register names (PIDs). The VID-PID mapping mechanism then tracks the generated VID-PID mapping associated with that instruction along each subsequent pipeline stage until it ultimately updates the final VID fields associated with the physical data registers at the end of the pipeline.

In this way, register-based data dependencies between instructions in pipeline stages which follow the pipeline stage containing the mapping mechanism may be detected by directly comparing the PIDs of registers used as sources by instructions in earlier pipeline stages with the PIDs of registers written as destinations by instructions in later pipeline stages. This eliminates the effects of false dependencies that would otherwise be generated by intervening instructions that simply reorder data between architectural registers.

Processor 106 also includes a mechanism to copy (i.e., pipeline flush copy operation) the contents of the VID registers associated with the physical data registers into the VID-PID mapping registers in the early pipeline stage (e.g., decode stage 210) that contains the initial VID-PID mapping mechanism (e.g., mapping register 251). This is done in order to reset the VID-PID mapping to that of the last instruction successfully completed, in the event that intervening instructions in the pipeline are canceled due to their incorrect speculative execution.

FIG. 3 depicts flow chart 300, which illustrates the operation of exemplary pipelined processor 106 according to one embodiment of the present invention. Initially, mapping register 251 contains VID-PID mapping data for the last instruction decoded by decode stage 210. The processing of the next instruction begins when decode stage 210 receives the next instruction from instruction fetch stage 205 and decodes it (process step 305). Decode stage 210 decodes the new instruction and determines the new VID-PID mapping data based on two factors: 1) the operation being performed by the decoded new instruction and 2) the old VID-PID mapping data in mapping register 251 (process step 310). Decode stage 210 then stores the new VID-PID mapping data in mapping register 251 (process step 315).

The new decoded instruction is shifted from decode stage 250 into operand fetch stage 215 and the new VID-PID mapping data is shifted from mapping register 251 to mapping register 252 (process step 320). The processing of the new instruction continues as the decoded instruction is shifted from operand fetch stage 215 to execute stage 220 and then to write-back stage 225. At the same time, the VID-PID mapping data associated with the new instruction is shifted from mapping register 252 to mapping register 253 and then to mapping register 254 (process step 325). If no branch prediction error occurs (or if no branch prediction was associated with the new instruction), write-back stage 225 writes the VID-PID mapping register from mapping register 254 to mapping register 231 in register stack 230 (process step 330). If a branch prediction error did occur, processor 106 transfers the VID-PID mapping data of the last correctly executed instruction from mapping register 231 to mapping register 251 and flushes the pending instructions that are in the instruction pipeline (process step 335).

The present invention has numerous advantages over the prior art. Since after a single translation stage, all register names are converted to fixed, physical register names, it is simple to determine the source and destination operands of each instruction and any dependencies between instructions. Additionally, using a single translation stage to perform the VID-PID register mapping means that all other pipeline stages handle the on-chip registers in a conventional fashion, using just the physical register names. This makes it easy to adapt an existing micro-architecture or micro-architecture concepts for a conventional non-stack-based processor for use in a register-stack based machine, hence gaining the leverage of all the conventional micro-architecture innovations.

Although the present invention has been described in detail, those skilled in the art should understand that they can make various changes, substitutions and alterations herein without departing from the spirit and scope of the invention in its broadest form.

What is claimed is:

1. A data processor wherein comprising:
    a register stack comprising a plurality of physical registers operable to store operands required by instructions executed by the data processor, wherein the plurality of physical registers appear as a plurality of architectural registers to the instructions;
    an instruction execution pipeline comprising a plurality of processing stages, each of the processing stages operable to perform one of a plurality of execution steps associated with a pending instruction being executed by the instruction execution pipeline; and
    a first mapping register associated with a first one of the processing stages and a second mapping register associated with a second one of the processing stages,
    wherein the first mapping register is operable to store first mapping data used to determine a first physical register associated with a first architectural register accessed by a first instruction being processed in the first processing stage,
    wherein the first mapping register is operable to transfer the mapping data stored therein to the second mapping register when the pending instruction is transferred from the first processing stage to the second processing stage; and
    wherein the second mapping register is operable to store second mapping data used to determine a second physical register associated with a second architectural register accessed by a second instruction being processed in the second processing stage.

2. The data processor as set forth in claim 1 wherein the first mapping data comprises a physical identifier code identifying the first physical register associated with the first architectural registers to be accessed by the first instruction.

3. The data processor as set forth in claim 2 wherein the mapping data comprises a virtual identifier identifying the first architectural register to be accessed by the first instruction.

4. The data processor as set forth in claim 3 wherein the first physical register associated with the first architectural registers to be accessed by the first instruction is one of: 1) a source register containing a first operand to be retrieved by the first instruction and 2) a target register in which the first operand is to be stored by the first instruction.

5. The data processor as set forth in claim 1 wherein the data processor further comprises a third mapping register associated with the register stack, the third mapping register operable to store third mapping data used to determine a third physical register associated with a third architectural register accessed by a last executed instruction.

6. The data processor as set forth in claim 5 wherein the data processor is operable to transfer the third mapping data from the third mapping register to at least one of the first mapping register and the second mapping register.

7. The data processor as set forth in claim 1 wherein the first mapping registers comprises:
a virtual identifier-physical identifier (VID-PID) mapping register associated with a the first one of the processing stages that converts an architectural register name used by the first instruction entering the first one of the processing stages into a physical register name for the first physical register, wherein the data processor tracks a generated VID-PID mapping associated with the first instruction through subsequent ones of the processing stages, and wherein register-based data dependencies between instructions in subsequent ones of the processing stages are detected by comparing a PID of a source register used by the first instruction in one of the processing stages with a PID of a destination register written by an instruction in a subsequent one of the processing stages.

8. The data processor as set forth in claim 7 further comprising:
an apparatus operable to copy contents of a virtual identifier (VID) registers associated with the first physical registers into the VID-PID mapping register associated with the first one of the processing stages.

9. The data processor of claim 1, wherein the first physical registers has a fixed physical register name given by a physical identifier (PID) and a variable architectural register name given by a virtual identifier (VID), and wherein the VID for the first physical register is stored in a VID register associated with the first physical register.

10. The data processor of claim 9, further comprising an architectural-register reordering mechanism operable to virtually reorder results between the first architectural register associated with the first physical data register and the second architectural register associated with the second physical data register, the virtual reordering comprising modifying a data value in a first VID register associated with the first physical data register and modifying a data value in a second VID register associated with the second physical data register.

11. The method of claim 1, wherein the first mapping data comprises:
a physical identifier code identifying the first physical register associated with the first architectural register to be accessed by the first instruction; and
a virtual identifier identifying the first architectural register to be accessed by the first instruction.

12. A processing system comprising:
a memory operable to store data and executable programs; and
a data processor comprising:
a register stack comprising a plurality of physical registers operable to store operands required by instructions executed by the data processor, wherein the plurality of physical registers appear as a plurality of architectural registers to the instructions;
an instruction execution pipeline comprising a plurality of processing stages, each of the processing stages operable to perform one of a plurality of execution steps associated with a pending instruction being executed by the instruction execution pipeline; and
a first mapping register associated with a first one of the processing stages and a second mapping register associated with a second one of the processing stages,
wherein the first mapping register is operable to store first mapping data used to determine a first physical register associated with a first architectural register accessed by a first instruction being processed in the first processing stage,
wherein the first mapping register is operable to transfer the mapping data stored therein to the second mapping register when the pending instruction is transferred from the first processing stage to the second processing stage, and
wherein the second mapping register is operable to store second mapping data used to determine a second physical register associated with a second architectural register accessed by a second instruction being processed in the second processing stage.

13. The processing system as set forth in claim 12 wherein the data processor further comprises a third mapping register associated with the register stack, the third mapping register operable to store third mapping data used to determine a third physical register associated with a third architectural register accessed by a last executed instruction.

14. The processing system as set forth in claim 13 wherein the data processor is operable to transfer the third mapping data from the third mapping register to at least one of the first mapping register and the second mapping register.

15. For use in a data processor comprising a plurality of physical registers arranged in a register stack operable to store operands required by instructions executed by the data processor and an instruction execution pipeline comprising a plurality of processing stages, the plurality of physical registers appearing as a plurality of architectural registers to the instructions, each of the processing stages operable to perform one of a plurality of execution steps associated with a pending instruction being executed by the instruction execution pipeline, a method of handling data dependencies between ones of the instructions, the method comprising:
retrieving and decoding a first instruction;
determining first mapping data used to determine one of the physical registers associated with one of the architectural registers accessed by the first instruction based on previous mapping data associated with a previously fetched instruction and based on an operation performed by the first instruction affecting the register stack;
storing the first mapping data in a first mapping register associated with a first one of the processing stages; and
transferring the first mapping data stored in the first mapping register to a second mapping register associated with a second one of the processing stages when the first instruction is transferred from the first processing stage to the second processing stage.

* * * * *